Patented Apr. 20, 1954

2,676,131

UNITED STATES PATENT OFFICE 2,676,131

HALOGENATED HETEROCYCLIC INSECT TOXICANTS

Samuel Barney Soloway, Denver, Colo., assignor, by mesne assignments, to Shell Development Company, Emeryville, Calif., a corporation of Delaware No Drawing. Application December 4, 1948, Serial No. 63,626

8 Claims. (Cl. 167—33)

This invention relates to new compositions of matter possessing unexpectedly high toxicity to insect life.

More specifically, this invention relates to a group of polycyclic hydrocarbons which are both halogenated and oxygenated, and derivatives thereof which show not only unexpectedly high insecticidal activity, but, in addition, a surprisingly high order of stability to reagents which normally readily degrade the previously known organic halogenated insect toxicants, and it also relates to the methods of producing these new compositions.

One object of this invention is to produce organic materials possessing a high order of insecticidal activity.

Another object of this invention is the production of a group of insecticidally active organic compounds which are stable, under ordinary conditions of use, to the usual degradative actions of acids and alkalis.

A further object of this invention is the production of a group of stable, insecticidally active organic compounds with varying periods of residual insecticidal activity.

A still further object of this invention is the production of a group of stable, insecticidally active organic compounds with extended periods of residual insecticidal activity.

Other objects, features, capabilities and advantages are comprehended by the invention, as will later appear and as are inherently possessed thereby.

In recent years a number of halogenated hydrocarbons or simple hydrocarbon derivatives have been discovered which possess, to a high degree, the property of toxicity to various forms of insect life. All of these materials contain halogen atoms, some of which, in the presence of alkalinity, are labile. The loss of halogen under these circumstances, whether by substitution reactions or by dehydrohalogenation leaves the altered organic molecule with its insecticidal activity either markedly decreased or altogether destroyed.

The coincidence of highly labile halogen and insecticidal activity has been so marked that many able investigators in the field have suspected that a causal relationship must exist between the ease of halogen removal and the insecticidal properties of the molecule, and attempts to develop quantitative correlations between these properties have been made. In addition, a number of theories have been advanced in an attempt to justify the establishment of such a causal relationship.

The ease with which halogen and, concomitantly, insecticidal activity is lost from these compounds has, of course, restricted their use in situations in which a more stable insecticide could have been employed advantageously. This unfortunate instability has also increased the difficulties of formulating and of storing them for practical field use.

Quite unexpectedly, therefore, I have now made the surprising and novel discovery that a group of new halogenated compounds can be prepared which, while possessing a very high order of insecticidal activity, have their halogen atoms so firmly bound as to make them stable under conditions of alkalinity which cause the older halogenated insecticidal materials to lose halogen, and, simultaneously, to lose activity.

These new compositions of my invention are those possessing the basic carbon skeleton of a series of not more than five linearly fused bicyclo-(2.2.1)-heptane rings, the fusion occurring through the two-carbon atom bridges of the bicyclic rings, to produce a structure containing two terminal five-carbon atom rings. The basic carbon atom skeleton is, therefore, the one illustrated immediately below:

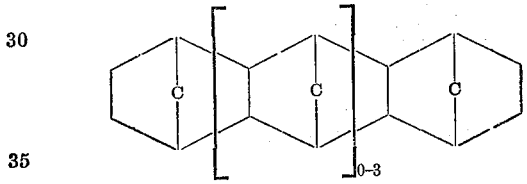

My new compositions are further characterized by the following unique structural features. Of the two terminal five membered carbon rings one contains a double bond in the unfused two-carbon atom bridge and bears on its carbon atoms only halogen atoms which, in general, may be of one species only or may be comprised of atoms of more than one halogen species; the halogens thus present are preferably those with atomic numbers lying between 16 and 36, a range embracing chlorine and bromine; the remaining terminal five membered carbon atom ring contains an epatomic component attached to the carbon atoms of the unfused two-carbon atom bridge and each of these two carbon atoms, in addition, also carry a univalent element or radical. It might advantageously be noted that the two carbon atoms last referred to correspond, in their positions in their ring, to the two carbon atoms in the other terminal ring denoted as bearing a double bond between them.

The term "epatomic component" hereinabove employed is restricted generically to the epoxide oxygen atom, the similarly bound sulfur atom and the similarly bound imino nitrogen atom. It thus includes the following illustrated atoms and groups when they are attached to each of two adjacent carbon atoms occurring in a carbon atom chain or ring structure:

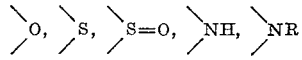

R being here used to represent any of the univalent atoms or radicals which, as is well known to those skilled in the art, can be attached to such sulfur and nitrogen atoms, such, for example, as alkyl groups, aryl groups, and many similar groups including, of course, their unsaturated and substituted derivatives.

For purposes of generic representation in structural formula the epatomic group will be shown as

attached always to two adjacent carbon atoms, as follows:

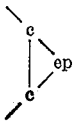

These new compounds of my invention may also be represented by the following structural formula:

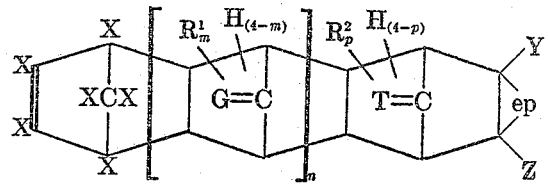

in which X represents a halogen atom, n has an integral value from 0 to 3, both inclusive, and m and p each has an integral value from 0 to 4, both inclusive, Y and Z are preferably but not necessarily selected from the group of monovalent atoms and radicals consisting of —H, —R, —Cl, —Br, —I, —OH, —OR, —SH, —SR, —NH$_2$, —NHR, —N(R)$_2$,

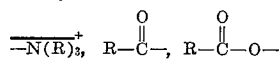

—COOH, —COOR, or —C≡N.

In the group of atoms and radicals set forth above, R represents a saturated hydrocarbon radical, an unsaturated hydrocarbon radical, a substituted derivative of a hydrocarbon radical or a substituted derivative of an unsaturated hydrocarbon radical. R$^1$ and R$^2$ in the structural formula shown may represent one or more halogen atoms or one or more substituting radicals as defined above for R which may be attached to carbon atoms forming the indicated rings of the structure shown.

For the sake of simplicity the substituents in the pentacarbon cycles or rings, other than the completely halogenated terminal ring are represented by the symbol R$^1_m$ and R$^2_p$, where m may range over an integral value from 0 to 4, both inclusive. More than one of these R type substituents may be present attached to the carbon atoms of the pentacarbon cycle, the number of groups so attached being defined by the integral values of m and p. The values of m and p thus define the number of substituents in each cycle. Since, in these rings each carbon atom must be attached either to a substituent, as previously defined, or to a hydrogen atom, the number of hydrogen atoms remaining attached to carbon atoms in each pentacarbon ring is given by the value of (4—m). These R type groups may arise through the use of substituted cyclopentadienes in the preparation of the polycyclic dienophiles from which my new compositions of matter may be considered to be derived, as the result of halogenation reactions, or as a result of other reactions utilized to introduce such groups into the pentacarbon ring involved.

In the formula indicated the symbols G and T may also represent one or more substituents which are selected from the group consisting of H, halogen atoms, —R and =R. —R is here used in the same sense as hereinbefore defined; =R represents a saturated or unsaturated alkylidene or cycloalkylidene radical or a substituted derivative thereof. By an alkylidene radical, a radical of the general type

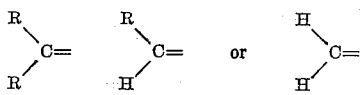

wherein R is used in its previously defined sense, is meant. A cycloalkylidene radical is one possessing the structure

n having any desired integral value including and greater than one.

If alkylidene or cycloalkylidene radicals are represented by the symbols G or T, no other groups are attached to the endomethano carbon atoms. In any other case two of the other members of the indicated group, independently selected, will be attached to that carbon atom.

The alkylidene and cycloalkylidene type substituents may arise through the use of fulvenes in the preparation of the polycyclic dienophiles from which my new compositions of matter may be considered to be derived. Other members of the group may arise in the same fashion as has been hereinabove described for R$^1$ and R$^2$.

These new and remarkable compounds which I have discovered can now, in general, be prepared by a diversity of means.

Thus, they can be obtained by the action of strong alkali, under suitable conditions, from the halo-hydrins disclosed in co-pending application, United States Serial No. 795,140, filed December 31, 1947, now Patent No. 2,635,979.

Alternatively, they may be obtained by the epoxidation of the compounds disclosed in co-pending application, United States Serial No. 45,573, filed August 21, 1948, now Patent No. 2,635,977.

These new compounds of my invention may also be readily prepared by means of the Diels-Alder diene synthesis using a hexahalocyclopentadiene and the mono-epoxy derivative of polycyclic dienes such as are disclosed in the co-pending application of Hyman, Freireich, and Lidov, United States Serial No. 45,574, filed August 21, 1948, still pending. Such dienophiles can be easily obtained by the mono-epoxidation of the compounds disclosed in the last cited application.

Dienophiles containing the epoxide grouping can, of course, be obtained in other ways and my present invention is in no sense to be limited to dienophilic epoxy compounds prepared by any particular means. While all of the procedures above indicated can be used to prepare these compounds herein disclosed, I prefer where possible, to proceed by the second of the routes described, namely, the epoxidation of the halogenated polycyclic dienes disclosed in co-pending application, United States Serial No. 45,573.

The epoxidation reaction can readily be accomplished with these compounds by standard procedures for this reaction utilizing oxidizing agents such as perbenzoic acid in chloroform or peracetic acid in acetic acid or in benzene as described in the examples which follow. These examples, of course, are for illustrative purposes and are not in any sense to be taken as limiting the scope of my invention.

The preparation of 6,7-epoxyhexachlorotetracyclododecene by means of the epoxidation of hexachlorotetracyclododecadiene (the Diels-Alder adduct of hexachlorocyclopentadiene and bicyclo-(2·2·1)-2,5-heptadiene having a melting point of from about 100.5 to about 104.5° C. as described in said copending application Serial No. 45,573) using perbenzoic acid in chloroform is illustrated in Example 1.

EXAMPLE 1

Hexachlorotetracyclododecadiene (58.4 grms., 0.16 mole) was added to 340 ml. of a 0.5 M solution of perbenzoic acid (0.17 mole) in chloroform and dissolved by swirling. The reaction solution became warm: it was allowed to stand overnight, after which iodometric titration showed the reaction to be practically complete. The reaction product was isolated by removing the organic acids by means of alkaline washes and by removing the chloroform by distillation in vacuo. The yield of crude product was quantitative. Crystallization from methanol yielded the pure compound as needles melting at 176–177° C.

Analysis: Calculated for $C_{12}H_8OCl_6$: C, 37.83; H, 2.12; Cl, 55.84. Found: C, 37.70; H, 2.07; Cl, 55.83.

The compound thus obtained is 6,7-epoxyhexachlorotetracyclododecene, probably having the "exo" configuration and presumably possessing the structure

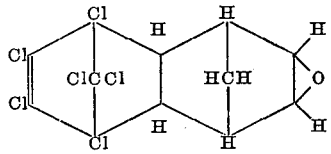

A similar preparation of this same compound utilizing peracetic acid in acetic acid is shown by Example 2.

EXAMPLE 2

Thirty-six and one-half grams of hexachlorotetracyclododecadiene was dissolved in 180 grms. of acetic anhydride. Forty grms. of 30% hydrogen peroxide was added to the stirred solution which, initially, was at room temperature. The addition was completed in one-half hour, the temperature of the solution rising to 30° C. White crystals separated after the addition of several grams of the peroxide. The mixture was stirred overnight; the temperature was maintained at about 25° by external cooling.

Filtration of the reaction mixture yielded 13 grms. of white crystals melting at 163–167° C. Additional product was obtained by diluting the filtrate with water, the total yield of crude product was quantitative.

A particularly useful procedure for the preparation of the new compound 6,7-epoxy-hexachlorotetracyclododecene is described in Example 4. This simple and economical process is made possible by the method I have developed and disclose in Example 3 for preparing 70% (by weight) peracetic acid. This overall procedure readily lends itself to large scale operation.

EXAMPLE 3

To 37.7 grms. of 90% hydrogen peroxide (one mole) was added 6 grms. (0.1 mole) of glacial acetic acid and the solution was cooled to a temperature between 15 and 20° C. After fifteen minutes vigorous stirring was commenced and there was added to the solution, dropwise, a solution of acetic anhydride (12.75 grms., 0.125 mole) containing 0.237 grm. of concentrated sulfuric acid. The temperature was maintained below 20° C. throughout the course of this addition. After the addition was complete, the resulting solution was stirred at the previously indicated temperature for a half-hour period. Following this, there was added to the solution under the same conditions previously used 25.5 grms. of acetic anhydride (0.25 mole) containing 0.474 grm. of concentrated sulfuric acid. This addition was performed very slowly. Subsequent to this second addition of acetic anhydride, stirring and cooling was maintained for a period of an hour following which a third portion of acetic anhydride (12.75 grms., 0.125 mole) containing 0.237 grm. of concentrated sulfuric acid was added. The conditions maintained during the addition were identical with those previously described herein. Following this last and final addition of acetic anhydride the solution was stirred with cooling for a half-hour period, and then permitted to stand in an icebox overnight. Titration of the solution the following morning showed that it contained no less than 70% by weight of peracetic acid.

EXAMPLE 4

Hexachlorotetracyclododecadiene (2190 grms., 6.0 moles) was dissolved in approximately 400 ml. of benzene and to the well-stirred solution maintained between 45 and 50° C. there was added 7.2 moles of peracetic acid in the form of its 70% solution prepared as described in the preceding example. The epoxidation reaction was markedly exothermic and the rate of addition of the peracetic acid solution was regulated to avoid exceeding a reaction temperature of 50° C. External cooling of the reaction mixture was employed in order to increase the rate at which the peracetic acid could be added, care being exercised to avoid lowering the reaction temperature below 45° C. Complete addition of the peracetic acid solution required approximately 120 minutes. Following completion of the addition, the reaction mixture was stirred for approximately 120 minutes to allow completion of the epoxidation reaction. The reaction mixture during this completion period was maintained within the above described temperature range. External heating was employed when the reaction rate was no longer sufficient to maintain the required temperature. Subsequent to the two-hour completion period the reaction mixture was steam distilled while being vigorously stirred. The steam distillation residue from this operation was a heavy slurry which contained the desired epoxy compound as a white, finely crystalline solid. This slurry was vigorously stirred into a large volume of hot water and the separated solid was recovered on a filter. This recovered solid, for a second time, was stirred into a large volume of hot water and then again recovered on a filter and air-dried. The crude epoxy compound was thus obtained in a yield corresponding to approximately 90% of that theoretically possible. The crude product melted between 150 and 175° C.

Purification of this crude solid epoxide was effected by dissolving it in a minimum of hot acetone and treating the resulting solution with decolorizing carbon which was subsequently separated on a filter. The resulting filtered solution was slowly thrown into a large volume of vigorously stirred, boiling water, whereupon the acetone solvent was lost by evaporation and solution in the water and the desired epoxide was thrown down as a very finely divided solid. This solid was brought onto a filter and air dried. The material thus obtained melted between 162–168° C. It shows an insecticidal activity equal to that of chemically pure 6,7-epoxyhexachlorotetracyclodecene.

Using substantially similar procedures a large number of derivatives of 6,7-epoxyhexachlorotetracyclododecene can be prepared. Examples 5, 6, 7, 8 and 9, which follow, illustrate such preparations more concretely.

EXAMPLE 5

Trans - 6,7 - dichloro - hexachlorotetracyclododecene (13.1 grms. 0.03 mole) was suspended in a solution containing 8.5 grms. (0.15 mole) of potassium hydroxide in 90 ml. of 95% ethanol and the mixture was refluxed for a period of two hours. The halide dissolved slowly in the hot solvent and sodium chloride separated during the period of reflux. After two hours the reaction mixture was cooled and the solid salt was separated on a filter. The oil obtained upon removal of the ethanol was freed of inorganic materials by dissolution in ethyl ether. Evaporation of the ether gave 12.5 grms. of crude oil which was distilled. There was thus recovered 9.8 grms. of purified product boiling at 148–152° C. under 1.2 mm. Hg abs. The purified product, subsequently crystallized from ethanol, yielded prisms melting at 55–57° C.

Analysis: Calculated for $C_{12}H_7Cl_7$: C, 36.09; H, 1.77; Cl, 62.15. Found: C, 36.14; H, 1.75; Cl, 62.74.

The new compound thus prepared is 6-chloro-hexachlorotetracyclododecadiene presumably possessing the structure represented by the formula

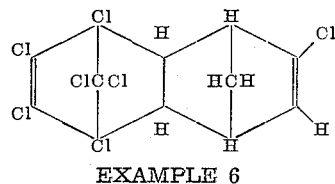

EXAMPLE 6

Five grms. (0.075 mole) of 50% hydrogen peroxide was added dropwise and with vigorous stirring to 10 grms. (0.025 mole) of 6-chloro-hexachlorotetracyclododecadiene dissolved in 22 grms. of acetic anhydride. The reaction mixture became milky upon addition of the peroxide and evolved heat. After one hour the mixture changed to a clear, yellow solution from which crystals were deposited on the bottom of the flask. The crystals were collected, washed with acetic acid and dried; 4.5 grms. of product melting at 140–145° C. were thus obtained. Crystallization of this product from methanol yielded the pure compound as prisms melting at 148–149° C.

Analysis: Calculated for $C_{12}H_7OCl_7$: C, 34.70; H, 1.70; Cl, 59.75. Found: C, 35.22; H, 1.87; Cl, 60.78.

The new compound thus obtained is 6-chloro-6,7-epoxyhexachlorotetracyclododecene, probably having the "exo" configuration and presumably possessing the structure represented by

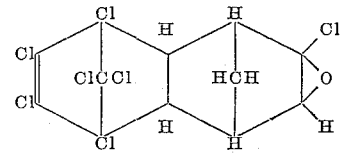

EXAMPLE 7

To 182.0 grms. (0.5 mole) of hexachlorotetracyclododecadiene dissolved in 250 ml. of carbon tetrachloride and heated to 65° C. was added dropwise, with stirring, a solution containing 80.0 grms. (0.5 mole) of bromine in 150 ml. of carbon tetrachloride. Radiation of the reaction solution with ultra violet light was used to initiate the reaction. After addition of the bromine solution was complete the solvent was removed by distillation. The oily residue thus obtained was dissolved in hot heptane treated with decolorizing charcoal and permitted to crystallize from the cooled solvent. A theoretical yield of material melting over the range 120–145° C. was thus obtained. Subsequent fractional crystallization from heptane separated the wide melting product into two crystalline fractions, one of which melted at 171–172° C. and the other of which melted at 151–152° C. Elementary analysis of these two materials is identical.

Analysis: Calculated for $C_{12}H_8Br_2Cl_6$: C, 27.42; H, 1.52; M. W., 525. Found: C, 27.49; H, 1.66; M. W. 524.

The new compounds thus obtained are two of the three theoretically possible 6,7-dibromohexachlorotetracyclododecenes obtainable by bromination of the presumably "exo" hexachlorotetracyclododecadiene and each of them is believed to be correctly represented by the planar structural formula

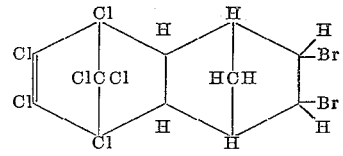

EXAMPLE 8

6,7-dibromohexachlorotetracyclododecene (265 grms., 0.5 mole) and 280 grms. (5.0 moles) of potassium hydroxide were dissolved in three liters of isopropyl alcohol. (The mixed dibromo isomers of the preceding example were employed.) The resulting solution was refluxed, with constant stirring, for 16 hours. It was then cooled to room temperature, the precipitated potassium bromide was separated on a filter and the solvent alcohol was removed by distillation. The resulting oily residue was taken up in ether and the ether solution was washed with water and dried. Subsequent removal of the ether left an oily residue which, crystallized from methanol, yielded white crystals melting at 84–85° C. One-hundred and ninety grms. of pure product (85% theoretical) was thus obtained.

The new compound thus prepared is the expected 6-bromo-hexachlorotetracyclododecadiene presumably possessing the structural formula represented by

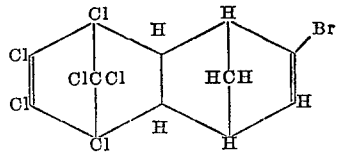

EXAMPLE 9

To a solution at room temperature containing 50.5 grms. (0.114 mole) of 6-bromohexachlorotetracyclododecadiene dissolved in 30 ml. of benzene was added with stirring 21 ml. (0.2 mole) of 9.6 M (63% by weight) peracetic acid solution. The reaction mixture was warmed to a temperature of 50° C. which was maintained for two hours. Stirring was then continued overnight at room temperature.

A white solid which had separated was collected, washed with hexane and dried. There was thus obtained 23 grms. of crude product melting at 144–146° C. Crystallization of this crude material from methanol yielded the pure compound as prisms melting at 150–153° C. Additional product obtained from the reaction mixture, after dilution thereof with water, raised the total recovery of crude product to its theoretical maximum value.

Analysis: Calculated for
  $C_{12}H_7OCl_6Br$: C, 31.30; H, 1.52.
Found:
  C, 31.53; H, 1.54.

The new compound thus obtained is 6-bromo-6,7 - epoxyhexachlorotetracyclododecene, probably having the "exo" configuration and presumably possessing the structure represented by the formula

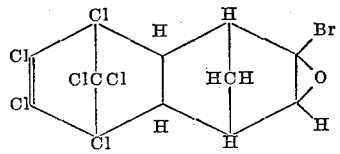

The foregoing examples have served to demonstrate the preparation of the new compounds of my invention through the use of expoxidation procedures. Example 10, which follows, illustrates the fact that the normal preparative procedures of organic chemistry can be utilized in order to convert these new compounds into yet other entirely new derivatives.

EXAMPLE 10

A solution containing 9 grms. of 6-bromo-6,7-epoxy - hexachlorotetracyclododecene and 40 grms. of potassium hydroxide in 300 ml. of ethanol was refluxed for a period of about three days. The dark reaction mixture was poured into water and the organic matter was taken up with ether. The ethereal solution was evaporated and the residue, dissolved in methanol, was treated with charcoal. Three crystallizations from methanol yielded well-defined crystals melting at 112–113° C.

Analysis: Calculated for
  $C_{14}H_{12}O_2Cl_6$: C, 39.56; H, 2.85; Cl, 50.06.
Found:
  C, 38.35; H, 3.25; Cl, 50.11.

The compound thus obtained is 6-ethoxy-6,7-epoxyhexachlorotetracyclododecene, probably possessing the "exo" configuration and presumably having the structure

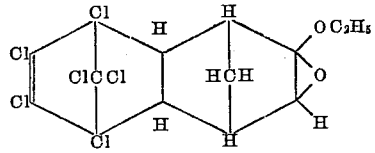

Example 11 illustrates the preparation of one of my new compositions which contains a sulfur atom occupying a position analogous to that of the epoxy oxygen in the compound hereinbefore shown. Such a compound will henceforth be referred to as an "episulfido" derivative.

EXAMPLE 11

A mixture of 5.25 grms. (.01 mole) of the 170° C. melting 6,7-dibromohexachlorotetracyclododecene, 12 grms. (.05 mole) of $Na_2S \cdot 9H_2O$ and about 250 ml. of 95% ethanol was refluxed for a period of 40 hours. The reaction mixture was then diluted with an equal volume of water and filtered. The crude solid product was washed with water, dried and recrystallized from hexane to give a solid melting at 199–202° C.

Analysis: Calculated for
$C_{12}H_8Cl_6S$: C, 36.27; H, 2.02; S, 8.06; Mol. Wt. 397.
Found:
  C, 36.34; H, 2.00; S, 8.04; Mol. Wt. 393.

The compound thus obtained is 6,7-episulfidohexachlorotetracyclododecene presumably possessing the structure

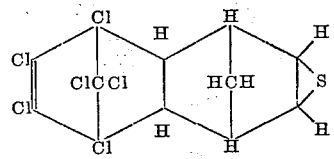

While the preceding examples have illustrated the preparation of my new compounds by means of the epoxidation of halogenated polycyclic dienes and derivatives thereof, it should be clearly understood that my invention is not limited to compounds thus prepared. Those skilled in the art will readily perceive, now that I have disclosed the existence and utility of such compounds, that the new epoxides which I have discovered can be made by other means and such compounds, regardless of the methods used to prepare them, properly fall within the scope of my invention.

As is the case with all molecules of the type herein discussed, a number of stereo-isomers are possible all of which are comprehended by a planar structural representation such as

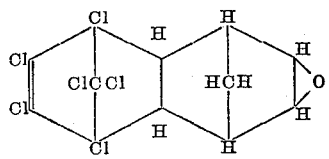

I

Without unduly extending the scope of a discussion bearing on stereo-chemical configurations, it may be well to indicate briefly the nature of the differences which generally it is believed exist between the various compounds, all of which are represented by a structure such as that hereinabove set forth.

Given a simple bicycloheptene compound such as

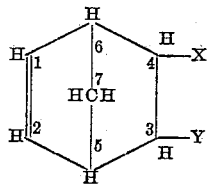

it is believed that the four carbon atoms 1, 2, 3, and 4 may be considered to lie in the plane of the paper with the carbon atoms 5 and 6 above that plane and the carbon atom 7 raised above that plane even further than atoms 5 and 6. The bonds joining the atoms H and X and H and Y to carbon atoms 3 and 4 are then thought to be disposed above and below the plane of the paper. These structures may be represented by three dimensional drawings, thus:

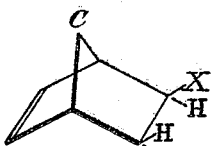

(a)

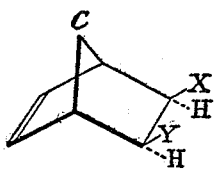

(b)

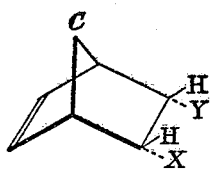

(c)

Assuming that both X and Y are taken to represent chlorine atoms, the compound (a) is a trans-dichloro compound, (b) is an exo-cis-dichloro compound and (c) is an endo-cis-dichloro compound in accordance with the nomenclature most commonly employed.

It is further widely believed that when the attachments X and Y are part of a ring system of not more than 6 members the rings thus fused must assume either an exo-cis or an endo-cis configuration, a transconfiguration being necessarily excluded.

If a compound such as I above is further examined, it follows that, without giving consideration to the terminal oxygen containing three membered ring, four theoretically possible stereoisomers are represented: (1) A compound in which the second six-membered ring is fused in the exo-cis position and in which the endo-methano bridge in the second ring is oriented, in a general sense, in the same direction as the endo-methano bridge in the first six-membered rings; (2) A compound in which the second six-membered ring is fused in the exo-cis position but in which the orientation of the second endo-methano bridge is directed in the opposite sense from that of the first. These may be shown three dimensionally as:

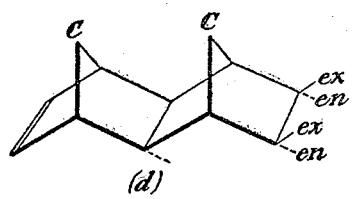

(d)

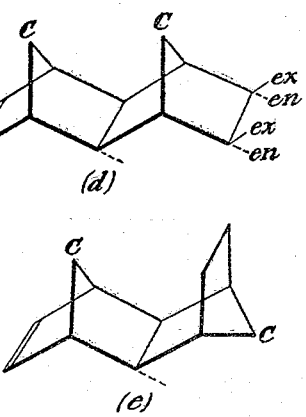

(e)

The other two compounds represented by the planar structure I are the corresponding variants in which the second fused ring is in the endo-cis position. These may be shown as:

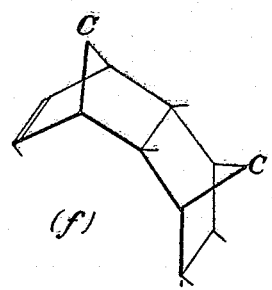

(f)

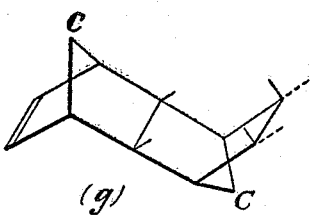

(g)

It is the consensus of those skilled in the art that compounds of the type herein disclosed, as well as those disclosed in the co-pending applications previously referred to have the configuration shown at (d). I further believe that the epoxides obtained by the herein described and illustrated epoxidation reactions are joined to the polycyclic ring systems by the bonds denoted as "ex" in (d) and hence are exo-cis epoxides. I believe, too, that dehydrohalogenation of halohydrins, as previously discussed leads to both exo-cis and endo-cis epoxides, depending on the configuration of the halo-hydrins, all of which are comprehended in the planar structural representations of the earlier co-pending applications and in the planar structural representations of this present specification.

It should also be noted that the absolute magnitude of the toxic action displayed by these compounds toward insects may and does vary with stereo-chemical configuration so that the various stereo-isomers all of which are properly represented by a single planar structural formula need not necessarily possess identical insecticidal activity.

In many instances it is possible to go from the exo series of compounds to the endo series with comparative ease. Thus, if exo-6,7-epoxy-hexachlorotetracyclododecene is treated with acetic acid at temperatures in the vicinity of 100° C. in the presence of a catalyst, such for example, as sulfuric acid, a hydroxy acetate is obtained. This hydroxy acetate, by treatment with phosphorus tri-bromide, or other reagents equally well suited for the purpose, can be converted to a bromo-acetate. This latter compound, on treatment with alkali, is hydrolyzed and dehydrohalogenated to give the endo-6,7-epoxyhexachlorotetracyclododecene.

It is, of course, to be understood that the scope of my invention is in no way to be limited by the structural theory herein discussed or by any statement I make as to the probable stereochemical configuration of the compounds I disclose.

The corresponding nitrogen epatomic groups can also readily be introduced by procedures sufficiently well known to the art as to require little elaboration. It might, however, be well to describe one of the means by which a phenylimino group can be attached in order to give some brief indication of the variety of reactions available for these purposes.

Hexachlorotetracyclododecadiene reacts with phenyl azide to yield phenyl triazol derivatives. The degradation of this compound by procedures well described and known to organic chemists results in the formation of 6,7-phenyliminohexachlorotetracyclododecene.

As is to be expected the alkaline stability of these new compositions will be dependent to some extent on the number and character of the substituents which are attached to the basic halogenated hydrocarbon structures. For my present purpose the basic hydrocarbon structures are taken to be those represented by the structural formula:

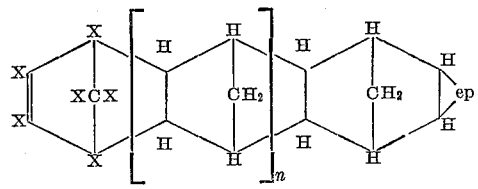

wherein $n$ assumes an integral value from 0 to 3, both inclusive, and X represents a halogen atom. In this connection it should be pointed out that a substituent such as, for example, a carboxylic acid ester group cannot be expected to exhibit complete stability toward alkali, since it contains a hydrolyzable ester grouping. However, these new compounds containing such substituents are alkali stable with respect to their ring halogen.

These new compositions of matter which I have discovered are highly toxic to insect life. This property, in view of the high alkaline stability which they exhibit, is a phenomenon, as has already been indicated, both completely unexpected and of great economic significance.

The high insecticidal potency of my new compounds is illustrated by the data which follows in Table II which shows their toxicity to the common house fly (Musca domestica) in terms of the new halogenated insecticide chlordane, which for this purpose is rated at 100% or in terms of the new halogenated insecticide 1(or 3a),4,5,6,7,8,8-heptachloro - 3a,4,7,7a - tetrahydro - 4,7 - methanoindene (hereinafter referred to as Hepta-Klor), which, for comparison with compounds tested against it, is also rated 100%. The figures which are shown were obtained using the Kearns modified small chamber method of test (Soap and Sanitary Chemicals, May, 1948, page 133) and the figures in Table II represent the relationship between the weight of chlordane or Hepta-Klor required to produce an LD$_{50}$ and the weight of compound required to produce this same mortality.

The significance of these tests may be more readily appreciated after reference to Table I which shows the ratings of the commonly used organic halogenated insecticides when compared, in tests similar to those described above, with Hepta-Klor.

Table I

| Compound | Relative Toxicity, Percent |
| --- | --- |
| Hepta-Klor (standard) | 100 |
| gamma isomer, Hexachlorocyclohexane | 100 |
| Chlordane | 40 |
| DDT | 10 |

Table II

| Compound | Relative Toxicity, Percent |
| --- | --- |
| Chlordane (standard) | 100 |
| 6,7-Epoxyhexachlorotetracyclododecene (pure) | 600 |
| 6,7-Epoxyhexachlorotetracyclododecene (crude) | 540 |
| 6,7-Episulfidohexachlorotetracyclododecene | 165 |
| Hepta-Klor (standard) | 100 |
| 6,7-Epoxyhexachlorotetracyclododecene | 250 |
| 6,7-Episulfidohexachlorotetracyclododecene | 70 |

Tests of the insecticidal potency of my new compounds using insects other than fles attest the generality of their high insect toxicity.

Thus, when 6,7-epoxyhexachlorotetracyclododecene is compared with Hepta-Klor as a toxicant for the German roach, it appears to be 5 to 6 times as effective as Hepta-Klor. Tested against the American roach and the confused flour beetle, my new compound appears to show activity equal to or slightly higher than Hepta-Klor. Tested against the red spider mite, 6,7-epoxyhexachlorotetracyclododecene is highly toxic at a concentration of 0.05% wt./vol. To this common pest none of the compounds listed in Table I is appreciably toxic.

These new compounds herein disclosed also show very high residual toxicity. In this respect they appear to be the equal of DDT. This fact, coupled with the fact of their very high degree of stability in the presence of alkaline reagents, indicates for them an immense field of usefulness as agricultural insecticidal materials. This very high residual activity is attested by the data hereinafter set forth.

6,7 - epoxyhexachlorotetracyclododecene has been applied to surfaces at the rate of 1 milligram per 1000 square centimeters (approximately 1.1 sq. ft.) of surface. At the end of a two-week exposure period the toxicity of the surface to roaches was not observably less than it had been immediately after the application of the toxicant.

In this connection, it should be observed that the degree of residual activity thus indicated is possessed by none of the commonly used organic toxicants with the exception of DDT. The duration of residual toxicity appears to be the same for my new compounds as it is for DDT.

It should also be noted, however, that the magnitude of the toxicity exhibited by 6,7-epoxyhexachlorotetracyclododecene is approximately 35 times that shown by DDT to the house fly and roughly 100 times that of DDT to the German roach.

My new compositions of matter can be utilized as insect toxicants in all the ways customary in the art. Thus they can be dissolved in the insecticide base oils normally employed (as was done to obtain the data of Table II) and the resulting solutions sprayed or otherwise employed in the usual fashion. They can also be combined with finely divided carriers to produce both wettable and non-wettable insecticidal dusts, they can be used in the preesence of emulsifying agents, with water and with water and oils to form insecticidal emulsions. They can also be incorporated in aerosol compositions, and, in general, they can be used either as the sole insect toxicant in an insecticidal composition or in combination with other insecticides in order to obtain combination properties and other desirable characteristics.

The unusual properties and great stability of my new compounds make them particularly suitable in a number of less common but highly desirable applications for insecticidal materials. Thus, they can be added to paints, lacquers, varnishes and polishing waxes, which, after application, will give surfaces possessing a high order of insect toxicity. They can be added to paper products of all types either by suitable impregnation of the finished paper material, or by incorporation during the manufacturing process. Similarly they can be added to tackifiers, plasticizers, printing ink, rubber products, etc., in order to provide finished objects possessing inherent toxicity to insect life and resistance to insect attack. They can also be added to various types of plastics and plastic sheetings in order to obtain packaging and wrapping materials themselves resistant to insect attack and able to protect objects packaged in them from such attack. Because of their high resistance to the action of alkali, my new compositions can be incorporated into white washes and other similar surface coatings. Those skilled in the art will, of course, recognize that many other similar uses for these unique compounds are possible, all of which follow from the special combination of valuable properties possessed by them.

It will be apparent to those skilled in the art that these new compositions of matter which I have invented will have many uses other than those already enumerated. Thus, some of these materials will have value as plasticizers and as tackifiers in many types of resinous and polymer compositions. These compositions are also valuable as starting compounds and intermediates for perfumes, medicinals, fungicides and other organic compounds useful in the arts and sciences.

Moreover, many modifications of the basic concept of my invention here presented will be evident to those skilled in the art. Such modifications are properly to be included within the scope of my disclosed invention which is, in no way, to be restricted by the various illustrative data hereinbefore contained but only by the claims appended hereto.

It is claimed:
1. A compound of the group consisting of (1) the compound having the formula

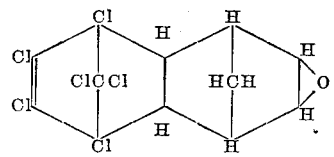

and a melting point when pure of about 176°–177° C., said compound being the epoxide of the Diels-Alder adduct obtained by heating hexachlorocyclopentadiene and bicyclo-(2,2,1)-2,5-heptadiene, and (2) the compound having the formula

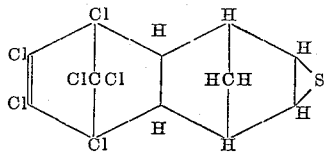

and a melting point of about 199°–202° C., said compound being the episulfide of the Diels-Alder adduct obtained by heating hexachlorocyclopentadiene and bicyclo-(2,2,1)-2,5-heptadiene.

2. The compound 1,2,3,4,10,10-hexachloro-6,7-epoxy - 1,4,4a,5,6,7,8,8a - octahydro - 1,4,5,8 - dimethanonaphthalene having the structural formula:

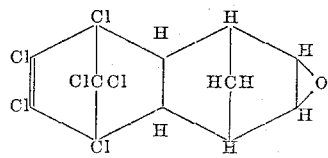

said compound having a melting point when pure of about 176°–177° C. and being the epoxide of the Diels-Alder adduct obtained by heating hexachlorocyclopentadiene and bicyclo-(2.2.1)-2,5-heptadiene.

3. The compounds 1,2,3,4,10,10-hexachloro-6,7-episulfido - 1,4,4a,5,6,7,8,8a - octahydro - 1,4,5,8 - dimethanonaphthalene having the structural formula:

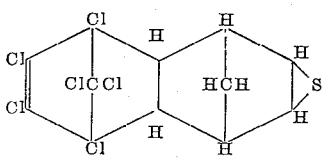

said compound having a melting point of about 199–202° C. and being the episulfide of the Diels-Alder adduct obtained by heating hexachlorocyclopentadiene and bicyclo-(2.2.1)-2,5-heptadiene.

4. The method of forming the compound of claim 2 which comprises epoxidizing 1,2,3,4,10,10-hexachloro - 1,4,4a,5,8,8a - hexahydro - 1,4,5,8 - dimethanonaphthalene having a melting point when pure of from about 100.5 to about 104.5° C. with an organic per acid selected from the group consisting of peracetic acid and perbenzoic acid.

5. An insecticidal composition of matter comprising a compound of claim 1 disseminated in an insecticidal adjuvant as a carrier therefor.

6. An insecticidal composition of matter comprising the compound of claim 2 disseminated in an insecticidal adjuvant as a carrier therefor.

7. An insecticidal composition of matter comprising the compound of claim 3 disseminated in an insecticidal adjuvant as a carrier therefor.

8. The method which comprises applying to insects and their habitats a compound of claim 1.

References Cited in the file of this patent
UNITED STATES PATENTS

| Number | Name | Date |
|---|---|---|
| 2,010,841 | Bender | Aug. 13, 1935 |
| 2,152,003 | Van Peski | Mar. 28, 1939 |
| 2,225,573 | Tandeloo | Dec. 17, 1940 |

OTHER REFERENCES

Knipling—Soap and Sanitary Chemistry, July 1947, pages 127, 129.